United States Patent Office 2,812,341

Patented Nov. 5, 1957

1

2,812,341

HYDROCHLORINATION PROCESS

Elizabeth L. Fareri, Pittsburgh, and John P. Pellegrini, Jr., Blawnox, Pa., assignors to Gulf Research & Development Company, Pittsburgh, Pa., a corporation of Delaware No Drawing. Application September 1, 1954, Serial No. 453,678

9 Claims. (Cl. 260—408)

This invention relates to a hydrochlorination process, and more particularly to a method for preparing chlorinated aliphatic organic compounds by catalytic hydrochlorination of unsaturated aliphatic organic compounds containing an ethylenic linkage that is isolated from the activating influence of any functional group.

The addition of hydrogen chloride to an isolated ethylenic linkage, i. e., one which is removed by at least two carbon atoms from the activating influence of a functional group, has been found to take place with difficulty, if at all, when carried out according to previously suggested procedures.

According to this invention the hydrochlorination of unsaturated organic aliphatic compounds having a functional group and an ethylenic linkage removed therefrom by at least two carbon atoms is facilitated by a procedure that includes the step of forming an anhydrous reaction mixture containing the unsaturated aliphatic organic compound and at least a stoichiometric amount of dissolved hydrogen chloride in a form effective to hydrochlorinate the unsaturated aliphatic organic compound. The reaction mixture is maintained in contact with a Friedel-Crafts type catalyst other than hydrogen fluoride at least until the hydrochlorination reaction has reached substantial equilibrium, the catalyst being utilized in a ratio of at least about 0.4 equivalent weight of catalyst per mol of theoretically obtainable hydrochlorinated product.

Now considering the invention in greater detail, our process includes preparing chlorinated aliphatic organic compounds from unsaturated aliphatic organic compounds that are characterized by a functional group and a carbon-to-carbon ethylenic linkage removed therefrom by at least two carbon atoms. Compounds having one or more functional groups of the kind: carbonyl, sulfhydryl, sulfonyl, hydroxyl, sulfate, phosphate, thiophosphate, and amino are specifically included by the invention. Examples of unsaturated aliphatic organic compounds containing a carbonyl group are ethylenic carboxylic acids and anhydrides and derivatives thereof, such as metal salts, including neutral, basic and acidic salts, substituted and unsubstituted ammonium salts, substituted and unsubstituted amido derivatives and aliphatic esters. Hydrochlorination of other carbonyl-containing ethylenic componds such as aldehydes and ketones containing long chain alkenyl substituents involving isolated ethylenic linkages, for example, such as oleyl aldehyde, or dioleyl ketone, is also included by the invention. Ethylenic amines, such as 5-dodecenyl and 9-octadecenyl amines, and alcohols, such as 9-dodecenyl, 6-tetradecenyl, 6-octadecenyl alcohols, and the corresponding mercaptans, are respectively examples of unsaturated aliphatic organic compounds in which the functional group is amino, hydroxyl and sulfhydryl. Ethylenic acid sulfates, phosphates and thiophosphates of the foregoing alcohols can also be reacted according to the principles of this invention; for example, oleyl sulfate, mono-, di-, and tri-oleyl phosphates and thiophosphates can be treated according to this invention. Compounds which contain more than one functional group can also be reacted according to the present invention; thus, treatment of dilinoleic acid, N-oleylaminopropylamine and the like is included by this invention. The invention has particular value in the case of compounds having a functional group selected from the group consisting of carbonyl and hydroxyl.

2

The class of carboxylic acids which, themselves, or whose derivatives can be hydrochlorinated according to this invention includes mono-, di-, tri-, and poly-ethylenic acids containing from 5 to 60 carbon atoms and characterized by an isolated ethylenic linkage as indicated above. Representative examples of such acids are hydrosorbic acid, 4-, 5-, 9-, and 11-dodecenoic acids, myristoleic acid, oleic acid, elaidic acid, petroselenic acid, ximenic acid, sorbic acid, linoleic acid, dimerized linoleic acid, linolenic acid, eleostearic acid, stearidonic acid, i. e., 4,8,12, 15-octadecatetroenoic acid, and nisinic, i. e., 3,8,12,15, 18,21-tetracosahexaenoic, acid. Exceptionally outstanding results are obtained with ethylenic fatty acids, derivatives of ethylenic fatty acids that contain at least 10, and preferably 18 carbon atoms, and especially with the 18 carbon atoms monoethylenic fatty acids, such as oleic acid.

The acid anhydrides, amides, metal salts, ammonium salts, and aliphatic esters of the foregoing acids can also be reacted according to the principles of the herein disclosed invention. Within the broad class of indicated derivatives, the aliphatic esters and metal salts are especially important. Representative specific examples of suitable aliphatic esters include not only materials such as oleic, linoleic, and linolenic glycerides, which occur in natural fats and oils, but also ordinary monoalkyl esters such as methyl, ethyl, propyl and butyl, octyl and lauryl oleates, linoleates, and linolenates. Specific examples of salts of ethylenic acids which may be treated according to this invention are the alkali metal salts, for example, the sodium, potassium and lithium salts, the alkaline earth metal salts, e. g., the calcium, barium, strontium salts, as well as salts of other metals of Group 2 of the Periodic Table (Mendeleyev) such as the cadmium and magnesium salts, and heavy metal salts, for example, lead, mercury, copper salts, of oleic, linoleic, and linolenic acids. Particularly suitable are the neutral ethylenic fatty acid salts of metals that form Friedel-Crafts type catalysts, such as aluminum and iron, and especially those metals that form relatively mild Friedel-Crafts catalysts including specifically mercury, zinc, bismuth, zirconium, titanium, antimony and tin. Examples of such salts are the neutral zinc and stannic salts of oleic, linoleic and linolenic acids.

According to the preferred procedure of this invention, a reaction mixture is formed which contains at least the unsaturated organic compound that is to be hydrochlorinated, for example, oleic acid, and dry hydrogen chloride is dissolved therein, for example, in a mol ratio of 2:1 in the case of oleic acid. The reactants are caused to react, for example at 0° C., while the reaction mixture is maintained in contact with a Friedel-Crafts type catalyst other than hydrogen fluoride, for example, zinc dichloride, the catalyst being present in the ratio of, for example, 1 equivalent weight per mol of ethylenic compound and/or hydrochlorinated product in the case of oleic acid. The reaction is continued at the same conditions, for example, for 4, 8, 12, or preferably 24 or more hours. Although the reaction may be carried out with only the reactants and the catalyst in the reaction mixture, it is sometimes preferred to effect the reaction with the reactants in solution in an anhydrous, inert solvent, for example, benzene. An example of an instance of this kind is the case where the unsaturated organic compound and the hydrochlorinated product are solids at the conditions under which the reaction is carried out. Where a solvent is used, the reactants may be dissolved in either order, but it is normally expedient to dissolve first the unsaturated organic compound, then to add the catalyst, and then to dissolve the hydrogen chloride in the solution. This procedure is especially desirable where the solubility of the hydrogen chloride in the solvent is relatively low.

The solvent may be any anhydrous, inert solvent capable of dissolving the unsaturated compound and dry hydrogen chloride, and which does not reduce the effective concentration of the catalyst or reactants below the level necessary to effect the reaction. Other examples of solvents included by the invention are water-immiscible, organic solvents such as pentane, hexane, heptane, ethylene dichloride, tetrachlorethane, Stoddard solvent, carbon tetrachloride and diethyl ether. The quantity of solvent employed may be any amount sufficient to contain the necessary proportions of reactants and catalyst in the solution at the conditions of the reaction. Advantageously, the volume of solvent is not greatly in excess of the minimum quantity suitable for this purpose. Examples of suitable solvent:ethylenic compound volume ratios are 1:1, 3:1, 7:1, 15:1 and greater. The expression "inert solvent" is used to denote a solvent which undergoes no permanent chemical change during the course of the reaction.

The invention includes the use of Friedel-Crafts type catalysts other than hydrogen fluoride. Such catalysts are inorganic halide materials and are known in the art. Examples of such catalysts include aluminum trichloride, aluminum tribromide, aluminum triiodide, ferric chloride, boron trifluoride, niobium pentachloride and tantalum pentachloride. Among the class of Friedel-Crafts type catalysts, those which act as relatively mild catalysts are preferred in order to minimize side reactions. Friedel-Crafts type catalysts conventionally classified as relatively mild catalysts are, in the order of ascending activity, mercuric chloride, zinc dichloride, bismuth trichloride, titanium tetrachloride, zirconium tetrachloride, stannic chloride and antimony pentachloride. Friedel-Crafts type chloride catalysts are preferred, since the yields produced in reactions utilizing these catalysts comprise only chlorinated derivatives.

According to the principles of this invention, the Friedel-Crafts type catalyst is utilized in a ratio of at least about 0.4 equivalent weight per mol of theoretically obtainable hydrochlorinated product, the latter being based on the amount of unsaturated compound present in the reaction mixture. Thus, for example, if one mol of undecenoic is to be hydrochlorinated to form one mol of monochloro-undecanoic acid, 0.4 equivalent weight of catalyst or more will be used. If one mol of calcium dioleate is to be hydrochlorinated to form two mols of monochlorostearic acid, at least 0.8 equivalent weight of catalyst will be used.

For the purposes of this invention, the minimum catalyst concentration is important in that appreciably lower concentrations result in markedly reduced yields. Where maximum yields are important substantially greater catalyst concentrations than the minimum can be employed with advantage. However, as the catalyst concentration approaches 1 equivalent weight per mol of theoretically obtainable product, the improvement in yield per unit increment of catalyst begins to decline appreciably. Especially desirable catalyst concentrations are those that produce a ratio of at least about 0.5 equivalent weight of catalyst per mol of theoretically obtainable hydrochlorinated product. Yields closely approaching theoretical are obtainable with the use of the catalyst in a proportion of about one equivalent weight or more per mol of hydrochlorinated product. Although larger catalyst concentrations can be employed, ordinarily no further appreciable improvement in results will be obtained thereby. The expression "equivalent weight" is used herein in its conventional sense to mean the gram-molecular weight of the material in question, divided by the total positive, or negative, valence. Thus, an equivalent weight of aluminum trichloride is one-third the gram-molecular weight, and an equivalent weight of zinc dichloride is one-half the gram-molecular weight.

Following admixture of the unsaturated organic compound, and the inert, anhydrous solvent (if used) and the Friedel-Crafts catalyst, dry hydrogen chloride gas is dissolved in the reaction mixture under conditions such as to promote a high degree of solubility of the hydrogen chloride. These conditions may be achieved, for example, by reducing the temperature of the reaction mixture to some point above its freezing point which will permit the necessary quantity of hydrogen chloride to be dissolved. Temperatures of no lower than 0° to 5° C., such as may be obtained with an ordinary ice bath, have proved entirely satisfactory, even in instances of solvents in which the hydrogen chloride is relatively insoluble at room temperature. The dissolution of hydrogen chloride may of course be carried out at still lower temperatures, e. g., as low as −50° C., or at higher temperatures, e. g., up to about 50° C. Alternatively, the solubility of the hydrogen chloride in the reaction mixture may be promoted at higher temperatures, e. g., as high as 150° C. or higher, by dissolving the same under superatmospheric pressure, for example, 100, 200, 500, or up to as great as 200 p. s. i. g. The low temperature procedure, of course, can be carried out at atmospheric pressure which is in itself an appreciable advantage, and for this and other reasons, is preferred. The solubility of the hydrogen chloride, and therefore its concentration in the reaction mixture, can also be controlled to some extent by the choice and amount of solvent, if such is employed, since the solubility of the hydrogen chloride varies with the individual solvents. If desired, the solubility of the hydrogen chloride in the reaction mixture may be promoted by a combination of two or more of the foregoing expedients.

The presence in the reaction mixture of a large concentration of hydrogen chloride is essential to the success of the process. The quantity of hydrogen chloride added to the reaction mixture must be sufficient to furnish in the reaction mixture at least a stoichiometric quantity, i. e., at least the quantity theoretically required to achieve the desired degree of hydrochlorination of all of the unsaturated compound, of dissolved hydrogen chloride, in a form effective to hydrochlorinate the unsaturated compound, i. e., effective to add to ethylenic linkages in the unsaturated compound. This minimum amount is sometimes appreciably greater than theoretical, since in some instances the hydrogen chloride tends to form complexes in the reaction mixture, which complexes have greater affinity for the hydrogen chloride than do the ethylenic linkages in the unsaturated compound. Thus, for example, a greater than theoretical stoichiometric amount of hydrogen chloride is required where an oxygen-containing solvent, such as diethyl ether, is employed, in view of the formation of ether-hydrogen chloride complexes. Of course, the stoichiometrically required quantity of hydrogen chloride varies directly with the number of ethylenic linkages in the unsaturated compound that are to be hydrochlorinated. Thus, the minimum permissible concentration of hydrogen chloride is nearer the lower limit of 1 mol per mol of unsaturated compound, where the degree of unsaturation in the unsaturated compound is low, and where a non-oxygen-containing solvent is employed. Additional hydrogen chloride, on a mol for mol basis is required for each additional ethylenic linkage per molecule of unsaturated compound, where hydrochlorination of such additional ethylenic linkages is desired. The specific minimum hydrogen chloride concentrations required in instances involving oxygen-containing solvents vary according to the volume and kind of oxygen-containing solvent employed. In many instances, the simplest way of achieving the desired hydrogen chloride concentration is to saturate the reaction mixture with hydrogen chloride, provided that the minimum permissible quantity of hydrogen chloride in the solution is thereby reached or exceeded. The point of saturation of the reaction mixture to hydrogen chloride can be ascertained with reasonable accuracy simply by observation, or by adding hydrogen chloride until no temperature rise occurs due to the heat of solution of hydrogen chloride, or until the weight of the solution no longer continues to increase with passage of hydrogen chloride through the solution. Whether or not total saturation of the solution to hydrogen chloride is achieved, it is often advantageous to utilize hydrogen chloride proportions in substantial excess of the minimum permissible proportions, because of the mass action effect. Specific examples of suitable hydrogen chloride mol ratios with the ethylenic compound, utilizing, for example, benzene as a solvent, are: in the instance of, for example, oleic acid or linoleic acid, 1:1, 2:1, 5:1, 10:1, 20:1.

After the desired quantity of hydrogen chloride has been dissolved in the reaction mixture, we continue to maintain said mixture at conditions that are effective to promote the solubility of the hydrogen chloride, until the reaction reaches substantial equilibrium, or any desired lesser degree of completion. By "substantial equilibrium" is meant that stage beyond which the improvement in yield per unit increment of time begins to decline. This stage can be determined for any particular combination of reactants, catalyst and reaction conditions by a series of trial runs involving analysis of the reaction products after varying periods of storage. It has been found that even when the low temperature reaction procedure and a mild Friedel-Crafts type catalyst are used, substantial equilibrium is reached after a few hours, for example, about 4 hours, and substantially no improvement is obtained by contining the reaction after about 24 hours.

After the reaction mixture has reached the desired degree of completion, the reaction mixture is extracted with an excess of a solvent, for example, water, to separate unreacted hydrogen chloride, catalyst and any other water-soluble material from the reaction product. The raffinate comprises the hydrochlorinated organic compound. The hydrochlorinated compound may be recovered, per se, with or without previous drying of the raffinate in conventional manner, by evaporation of the solvent, if such was used. The recovered solvent may be reused in the process, if desired.

In one modification of the invention, a chlorinated fatty acid, for example, monochlorostearic acid, is prepared by dissolving dry hydrogen chloride in a reaction mixture containing a salt of an ethylenic fatty acid and a metal that forms a Friedel-Crafts type catalyst, e. g., zinc dioleate, aluminum trilinoleate, or the like, said dissolving being effected under conditions that promote a high degree of solubility for the hydrogen chloride, for example, 0° C. While we do not wish to be bound by any particular theory regarding the mechanism of the reaction, it is thought that the salt and hydrogen chloride may react to form, in situ, a metal chloride and a free ethylenic fatty acid. In any event, the amount of hydrogen chloride dissolved in the reaction mixture in this embodiment is sufficient to convert the salt to the free acid and a metal halide Friedel-Crafts type catalyst, and is also sufficient to furnish in the reaction mixture at least a stoichiometric quantity of dissolved hydrogen chloride in a form effective to hydrochlorinate the ethylenic compounds. For example, in the case of zinc dioleate, the hydrogen chloride:zinc dioleate mol ratio is at least 4:1; in the case of aluminum trilinoleate, the hydrogen chloride:aluminum trilinoleate mol ratio is at least 6:1. In other words, the hydrogen chloride is employed in amounts at least sufficient to provide a ratio of 1 mol of hydrogen chloride for each equivalent weight of salt, plus at least an additional mol of hydrogen chloride for each mol of theoretically obtainable hydrochlorinated product. Again, the desired concentration of hydrogen chloride normally may be conveniently obtained by saturating the reaction mixture therewith under conditions that promote the solubility of the hydrogen chloride. After dissolution of the required quantity of hydrogen chloride in the reaction mixture, the process is completed as set forth in the foregoing description. This modification is advantageous in that the catalyst is generated in situ.

The invention is further illustrated by the following specific embodiments:

*Example I*

Five hundred grams (1.77 mols) of oleic acid were dissolved in 1926 grams of diethyl ether, together with 266.0 grams of anhydrous zinc dichloride. Hydrogen chloride was bubbled into the solution (which was maintained at a temperature of from 0° to 5° C. by immersion in an ice bath) for a period of 12.5 hours, until the weight of the solution had increased by 714 grams. The ether solution was then stored at 0° C. for about 93 hours following which the solution was water-washed and dried over anhydrous sodium sulfate. Solvent was removed from the product by evaporation at room temperature and at substantially reduced pressure. The product yield was 558.1 grams and contained predominantly a mixture of 9- and 10-chlorostearic acids. Analysis of this product was as follows:

| | Actual | Theory for $C_{18}H_{35}O_2Cl$ |
|---|---|---|
| Neut. No | 176 | 175.9 |
| Mol. Wt. (from Neut. No.) | 318.7 | 318.92 |
| Chlorine, percent | 11.70 | 11.12 |
| Iodine No | 2.9 | 0 |

Other aliphatic organic compounds disclosed herein and characterized by a functional group and a carbon-to-carbon ethylenic linkage isolated therefrom by at least two carbon atoms can be substituted in the foregoing example with good results. For example, hydrosorbic, dodecenoic, myristoleic, elaidic, petroselenic, ximenic, sorbic, linoleic, linolenic, eleostearic, stearidonic, and nisinic acids, their ammonium, sodium potassium, lithium, calcium, barium, strontium, magnesium, and lead salts, their glycerides and their esters with methyl, propyl, butyl, octyl and lauryl alcohols can be substituted in the foregoing example on an equivalent weight for equivalent weight basis with good results. Other catalysts such as ferric chloride, aluminum trichloride, stannic chloride, titanium tetrachloride and boron trifluoride can be substituted for the zinc dichloride in the foregoing example on an equivalent weight for equivalent weight basis.

*Example II*

To show the effect of varying the quantity of hydrogen chloride dissolved in the solution, a series of runs was carried out according to the procedure described in Example I utilizing various concentrations of hydrogen chloride. In run 1, 20.6 grams (0.563 mols) of hydrogen chloride were dissolved in a solution of 100 grams (0.354 mols) of oleic acid and 53.2 grams (0.39 mol) of anhydrous zinc dichloride in 200 grams of anhydrous ethyl ether, while maintaining the solution at a temperature of from 0° to 5° C. The resulting solution was stored at 0° C. for about 93 hours, whereupon the reaction mixture was extracted with water, dried, and the solvent evaporated from the raffinate. Anlysis of the resulting product revealed a chlorine content of 0 percent. In this run insufficient hydrogen chloride was employed to furnish a stoichiometric amount in a form effective to hydrochlorinate the oleic acid, since that used complexed with the ether solvent.

In run 2, which exemplifies a specific embodiment of the invention, a similar procedure was carried out except that half portions of oleic acid, zinc dichloride and ether were used, and 60.8 grams of hydrogen chloride were dissolved in the solution. Analysis of the product of this run was as follows:

| | Actual | Theory for $C_{18}H_{35}O_2Cl$ |
|---|---|---|
| Chlorine, percent | 10.57 | 11.12 |
| Iodine No | 3.7 | 0 |

Run 3, another specific embodiment of the invention, was carried out by dissolving 15.3 grams of hydrogen chloride in a solution of 50 grams of oleic acid in 300 cc. of benzene in the presence of 26.6 grams of zinc dichloride, while maintaining the temperature of the solution at approximately 5° C. in order to minimize freezing of the benzene. Solid zinc dichloride was visible throughout the reaction period. Following solution of the hydrogen chloride, the solution was stored at 0° to 5° C. for about 90 hours. The reaction mixture was then extracted with water, dried over anhydrous $Na_2SO_4$, and the solvent removed by evaporation at atmospheric temperature and under a reduced pressure. Analysis of the product was as follows:

| | Actual | Theory for $C_{18}H_{35}O_2Cl$ |
|---|---|---|
| Chlorine, percent | 10.01 | 11.12 |
| Iodine No | 2.24 | 0 |
| Neut. No | 179 | 175.9 |

In run 4, another specific embodiment, 16.2 grams of hydrogen chloride were dissolved in 100.0 grams of oleic acid in the presence of 53.2 grams of zinc dichloride, while maintaining the temperature of the solution at about 0° to 5° C. The reaction mixture was then stored at 0° to 5° C. for about 24 hours. The reaction mixture was then extracted with water and dried. The product of this reaction had the following analysis:

| | Actual | Theory for $C_{18}H_{35}O_2Cl$ |
|---|---|---|
| Chlorine, percent | 9.48 | 11.12 |
| Iodine No | 3.3 | 0 |

In order to facilitate comparison, the hydrogen chloride:oleic acid:zinc dichloride mol ratios in the preceding four runs and in the run described in Example I, together with the resulting percent yield in each instance, have been set forth in the following table:

| | Hydrogen Chloride:Oleic Acid:Zinc Dichloride Mol Ratio | Solvent | Yield, percent by wt. (based on chlorine content) |
|---|---|---|---|
| Example II, Run 1 | 1.59:1:1.10 | Ether | 0 |
| Example II, Run 2 | 9.42:1:1.10 | Ether | 95 |
| Example II, Run 3 | 2.37:1:1.10 | Benzene | 90 |
| Example II, Run 4 | 1.25:1:1.10 | None | 85 |
| Example I | 11:1:1.10 | Ether | 100 |

In each of the foregoing runs, greater than stoichiometric proportions of hydrogen chloride were used. Only in run 1 of Example II was no yield obtained, the failure of the reaction being attributed to complex formation between the ether and the hydrogen chloride, whereby the effective concentration of the hydrogen chloride in the reaction mixture was reduced to a degree such that essentially no product could be formed. In runs 2, 3, and 4 of Example II, and in Example I, all of which are embodiments of the invention, very good yields were obtained.

*Example III*

To demonstrate the effect of variations in catalyst concentration, a series of five runs was carried out by saturating a solution of 50 grams of oleic acid and various amounts of zinc dichloride catalyst, if any, in 200 grams of diethyl ether with dry hydrogen chloride over a period of from 6 to 6.5 hours, while maintaining the temperature of the solution at from 0° to 5° C. The increase in weight of the solutions in the various runs due to absorption of hydrogen chloride varied from 97.7 grams to 110.1 grams. Following saturation of the solution with hydrogen chloride, the reaction mixture was stored at 0° C. for about 93 hours. The reaction mixture was then extracted with water, dried, and the solvent removed from the raffinate, and the resulting product subjected to analysis. The amount of catalyst in the five runs was varied from nil to one equivalent weight of catalyst per mol of theoretically obtainable chlorostearic acid. The specific catalyst concentrations for each run and the results obtained in these runs are presented in the following table:

| | Run 1 | Run 2 | Run 3 | Run 4 | Run 5 | Theory for $C_{18}H_{35}O_2Cl$ |
|---|---|---|---|---|---|---|
| Equiv. Wt. $ZnCl_2$ Per Mol of Theoretically Obtainable Chlorostearic Acid | 0:1 | 0.12:1 | 0.22:1 | 0.59:1 | 1:1 | |
| Chlorine, percent | 0.46 | 3.57 | 5.37 | 9.21 | 10.21 | 11.12 |
| Iodine No | 87.0 | 60.7 | 43.1 | 11.0 | 4.2 | 0 |
| Neut. No | 200 | 193 | 188 | 178 | 176 | 175.9 |

In the foregoing example, runs 4 and 5 are specific embodiments of the invention. The data in the foregoing table illustrate that essentially no hydrochlorination occurs in the absence of catalyst, that very good yields are obtainable with catalyst concentrations in excess of about 0.4 equivalent weight catalyst per mol of ethylenic acid, and that yields closely approaching theoretical yields are obtainable with catalyst concentrations of as great as about 0.5 to 1.0 or more equivalent weights of catalyst per mol of hydrochlorinated product.

*Example IV*

In order to illustrate specific reaction times during which the reaction can reach substantial equilibrium, as well as lesser degrees of completion, a series of seven runs were carried out, each run involving dissolving 114 grams of hydrogen chloride in a solution comprising 50.0 grams of oleic acid and 26.6 grams of zinc dichloride in 200 grams of diethyl ether, while maintaining the solution at a temperature of from 0° to 5° C. Following this step and after periods of storage at 0° C. ranging from 0 hours to 24 hours, the solution was extracted with water, dried over anhydrous $Na_2SO_4$, and the product recovered by evaporation of solvent under reduced pressure. The degree to which the reaction had proceeded was determined by analysis of the product. The results of these runs are set forth in the following table:

| | Storage Time, Hours | | | | | | | Theory for $C_{18}H_{35}O_2Cl$ |
|---|---|---|---|---|---|---|---|---|
| | 0 | 1 | 2 | 5 | 8 | 10 | 24 | |
| Chlorine, percent | 0.0 | 3.97 | 5.10 | 7.20 | 8.21 | 8.57 | 10.56 | 11.12 |
| Iodine No. | 80.3 | 57.2 | 46.0 | 30.8 | 20.9 | 18.3 | 3.7 | 0 |
| Neut. No. | 204 | 192 | 189 | 186 | 184 | 182 | 178 | 175.9 |

The foregoing data illustrate that the reaction reaches substantial equilibrium by about 4 hours (approximately 58% yield), and that the reaction is essentially complete after about 24 hours, even though carried out at low temperatures and in the presence of a mild catalyst.

*Example V*

To illustrate the hydrochlorination of another type of ethylenic compound in the class of compounds included by this invention, two runs were carried out involving dissolution of 25.0 grams of hydrogen chloride (0.686 mol) in a solution of 50.0 grams of oleyl alcohol (0.198 mol, based on acetyl number) in 50 grams of diethyl ether. In the first instance no catalyst was employed and in the second, a specific embodiment of the invention, 13.5 grams (0.099 mol) of zinc dichloride was employed. The reaction mixture for both runs was stored for 24 hours at 0° to 5° C., following which each was water-extracted and dried.

The analysis of the foregoing products was as follows:

| | Run 1 | Run 2 |
|---|---|---|
| Chlorine, Percent | 1.40 | 9.00 |
| Iodine No. | 64.4 | 3.6 |

Other aliphatic organic compounds having an isolated ethylenic linkage and being otherwise of the kind disclosed herein as suitable for the purposes of the invention may be substituted in the specific embodiment of the foregoing example with good results. For example, 4-, 5-, 9-, and 11-dodecenyl, 4-, 5-, 9-, and 11-tetradecenyl alcohols and the corresponding mercaptans, their sulfate derivatives, and their mono-, di- and tri-phosphate derivatives, and oleyl aldehyde, and oleyl amine can be substituted in the foregoing example on a mol for mol basis with good results. Similarly, other catalysts specifically disclosed herein as suitable, for example, aluminum trichloride, stannic chloride, can be substituted for the zinc dichloride in the foregoing example on an equivalent weight for equivalent weight basis with good results.

*Example VI*

To illustrate a modification of the invention wherein a salt of an ethylenic acid is used as a reactant, and in which the catalyst is generated in situ, 50 grams of a commercial zinc dioleate were dissolved in 320 grams of carbon tetrachloride and hydrogen chloride was bubbled through the solution for 7 hours, while maintaining a temperature of from 0° to 5° C. in order to saturate the solution. The zinc dioleate employed had an iodine number of 78.3, a zinc content of 6.34 percent by weight and a sulfate ash of 15.24 percent by weight. The solution was then stored at 0° C. for 65 hours and again saturated with hydrogen chloride by bubbling the latter through the solution for 5½ hours, while maintaining the solution at a temperature of from 0° to 5° C. The solution was then stored for about 22 hours. The reaction mixture was then water-washed and dried over anhydrous $Na_2SO_4$. The solvent was removed by evaporation at room temperature and under reduced pressure. The product yield was 51.0 grams and contained predominantly a mixture of 9- and 10-chlorostearic acids. This product was analyzed as follows:

| | |
|---|---|
| Percent chlorine | 9.93 |
| Percent ash ($SO_4$) | 0.01 |
| Iodine No. | 5.0 |
| Neut. No. | 170 |

Other salts of the kind disclosed herein as suitable can be substituted for the zinc dioleate used in the foregoing specific embodiment. For example, zinc dilinoleate, zinc dimyristoleate, aluminum trioleate, and ferric trisorbate can be substituted for the zinc dioleate of the foregoing embodiment on an equivalent weight for equivalent weight basis with good results.

The foregoing examples illustrate various specific embodiments and critical features of the invention.

The products of the process of this invention can be used, per se, as extreme pressure additives for petroleum lubricants, and they also can be used as intermediates in organic syntheses.

It will be understood that the invention can be practiced successfully either as a batchwise procedure or as a continuous procedure with recycle of hydrogen chloride.

Obviously, numerous modifications of the invention will suggest themselves to those skilled in the art. It is understood that such modifications may be practiced without departing from the spirit of the invention and that the invention is limited only by the scope of the appended claims.

We claim:

1. A process for hydrochlorinating an unsaturated aliphatic organic compound having a functional group selected from the group consisting of carbonyl and hydroxyl radicals, and an ethylenic linkage separated therefrom by at least 2 carbon atoms, comprising forming an anhydrous reaction mixture containing said unsaturated compound and at least a stoichiometric amount of dissolved hydrogen chloride in a form effective to hydrochlorinate the unsaturated aliphatic organic compound and free from any combination that has a greater affinity for the hydrogen chloride than does the ethylenic linkage in the unsaturated compound, and maintaining the reaction mixture in contact with a Friedel-Crafts type catalyst selected from the group consisting of aluminum trichloride, aluminum tribromide, aluminum triiodide, ferric chloride, boron trifluoride, niobium pentachloride, tantalum pentachloride, mercuric chloride, zinc dichloride, bismuth trichloride, titanium tetrachloride, zirconium tetrachloride, stannic chloride and antimony pentachloride, at least until the hydrochlorination reaction has reached substantial equilibrium, said catalyst being utilized in a ratio of at least about 0.4 equivalent weight of catalyst per mol of theoretically obtainable hydrochlorinated product.

2. The process of claim 1 in which the unsaturated organic compound is oleic acid.

3. The process of claim 1 in which the unsaturated aliphatic organic compound is oleyl alcohol.

4. The process of claim 1 in which the catalyst is zinc dichloride.

5. The process of claim 1 in which the reaction is carried out at atmospheric pressure and at a low temperature above the freezing point of the reaction mixture.

6. A process for preparing a chlorinated fatty acid comprising forming an anhydrous reaction mixture containing (*a*) a salt of a metal capable of forming a Friedel-Crafts type catalyst and selected from the group consisting of aluminum, zinc and iron and an ethylenic fatty acid in which the ethylenic linkage is separated from the carbonyl carbon atoms by at least 2 carbon atoms, and (*b*) hydrogen chloride in an amount sufficient to liberate the ethylenic fatty acid and the chloride of said metal, and also sufficient to furnish in the reaction mixture at least a stoichiometric amount of dissolved hydrogen chloride in a form effective to hydrochlorinate the unsaturated compound and free from any combination that has a greater affinity for the hydrogen chloride than does the ethylenic linkage in the unsaturated compound, and reacting the components until the hydrochlorination reaction has reached substantial equilibrium.

7. The process of claim 6 in which said salt is zinc dioleate.

8. A process for preparing mono-chlorostearic acid comprising forming an anhydrous reaction mixture containing oleic acid and at least a stoichiometric amount of dissolved hydrogen chloride in a form effective to hydrochlorinate the ethylenic linkage of the oleic acid and free from any combination that has a greater affinity for the hydrogen chloride than does the ethylenic linkage of the oleic acid, and zinc dichloride in the ratio of at least about 1 equivalent weight of zinc dichloride per mol of theoretically obtainable mono-chlorostearic acid, and maintaining the reaction mixture at a temperature of from about 0° to about 5° C. and above the freezing point of the mixture for at least about 4 hours, then extracting the reaction mixture with water, and recovering a raffinite containing mono-chlorostearic acid.

9. A process for preparing a mono-chlorostearyl alcohol comprising forming an anhydrous reaction mixture containing oleyl alcohol and at least a stoichiometric amount of dissolved hydrogen chloride in a form effective to hydrochlorinate the ethylenic linkage of the oleyl alcohol and free from any combination that has a greater affinity for the hydrogen chloride than does the ethylenic linkage of the oleyl alcohol, and zinc dichloride in the ratio of at least about 1 equivalent weight of zinc dichloride per mol of theoretically obtainable mono-chlorostearyl alcohol, and maintaining the reaction mixture at a temperature of from about 0° to about 5° C. and above the freezing point of the mixture for at least about 4 hours, then extracting the reaction mixture with water, and recovering a raffinite containing mono-chlorostearyl alcohol.

References Cited in the file of this patent

Kharasch et al.: "J. Am. Chem. Soc.," vol. 55 (1933), pages 2468–2496 (specifically page 2489).

Abraham et al.: "Chemical Society Journal" (1936), pages 1605–1607.

UNITED STATES PATENT OFFICE

CERTIFICATE OF CORRECTION

Patent No. 2,812,341 November 5, 1957

Elizabeth L. Fareri et al.

It is hereby certified that error appears in the printed specification of the above numbered patent requiring correction and that the said Letters Patent should read as corrected below.

Column 4, line 27, for "200 p. s. i. g." read -- 2000 p. s. i. g. --; column 5, line 36, for "contining" read -- continuing --; column 6, line 58, for "Anlysis" read -- Analysis --.

Signed and sealed this 17th day of December 1957.

(SEAL)

Attest:

KARL H. AXLINE
Attesting Officer

ROBERT C. WATSON
Commissioner of Patents